(12) United States Patent
Chabaud

(10) Patent No.: US 8,901,862 B2
(45) Date of Patent: Dec. 2, 2014

(54) COMMUTATED ELECTRIC DRIVE AND METHOD FOR CONTROLLING A COMMUTATED ELECTRIC MOTOR

(75) Inventor: Antoine Chabaud, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 347 days.

(21) Appl. No.: 13/387,925

(22) PCT Filed: Jul. 9, 2010

(86) PCT No.: PCT/EP2010/059907
§ 371 (c)(1),
(2), (4) Date: Apr. 10, 2012

(87) PCT Pub. No.: WO2011/012427
PCT Pub. Date: Feb. 3, 2011

(65) Prior Publication Data
US 2012/0181958 A1    Jul. 19, 2012

(30) Foreign Application Priority Data

Jul. 31, 2009   (DE) .......................... 10 2009 028 170

(51) Int. Cl.
*H02P 6/06* (2006.01)
*H02P 6/18* (2006.01)
*G01D 5/244* (2006.01)

(52) U.S. Cl.
CPC .............. *G01D 5/24495* (2013.01); *H02P 6/18* (2013.01)
USPC ............. 318/400.05; 318/400.02; 318/400.37

(58) Field of Classification Search
USPC ............... 318/400.05, 400.2, 400.37, 400.22; 235/462.4
See application file for complete search history.

(56) References Cited

U.S. PATENT DOCUMENTS

| | | | |
|---|---|---|---|
| 6,651,889 B2 * | 11/2003 | Belknap et al. | 235/462.4 |
| 2003/0080734 A1 * | 5/2003 | Hedayat et al. | 324/207.22 |
| 2006/0279244 A1 | 12/2006 | Rutkowski et al. | |

FOREIGN PATENT DOCUMENTS

| | | |
|---|---|---|
| CN | 1641981 | 7/2005 |
| CN | 201185382 | 1/2009 |
| CN | 101359893 | 2/2009 |
| JP | 2001-115737 | 4/2001 |
| JP | 2004-271495 | 9/2004 |
| JP | 2006-284420 | 10/2006 |
| WO | 2005/016217 | 2/2005 |

\* cited by examiner

*Primary Examiner* — Karen Masih
(74) *Attorney, Agent, or Firm* — Kenyon & Kenyon LLP

(57) ABSTRACT

A commutated electric drive has an electric motor having a sensor assembly which has a permanent magnet on a shaft of the electric motor and an analog Hall sensor situated stationary relative to the stator of the electric motor opposite to the permanent magnet. A controller for controlling the windings of the electric motor has a memory for storing a calibration Hall signal of the magnetic field of the permanent magnet, measured using the Hall sensor, over one revolution of the shaft. The controller has a device for comparing the calibration Hall signal with an instantaneous Hall signal of the instantaneous magnetic field of the permanent magnet, measured using the Hall sensor. Temperature effects and aging effects may be recognized and taken into account when determining the rotor position.

15 Claims, 2 Drawing Sheets

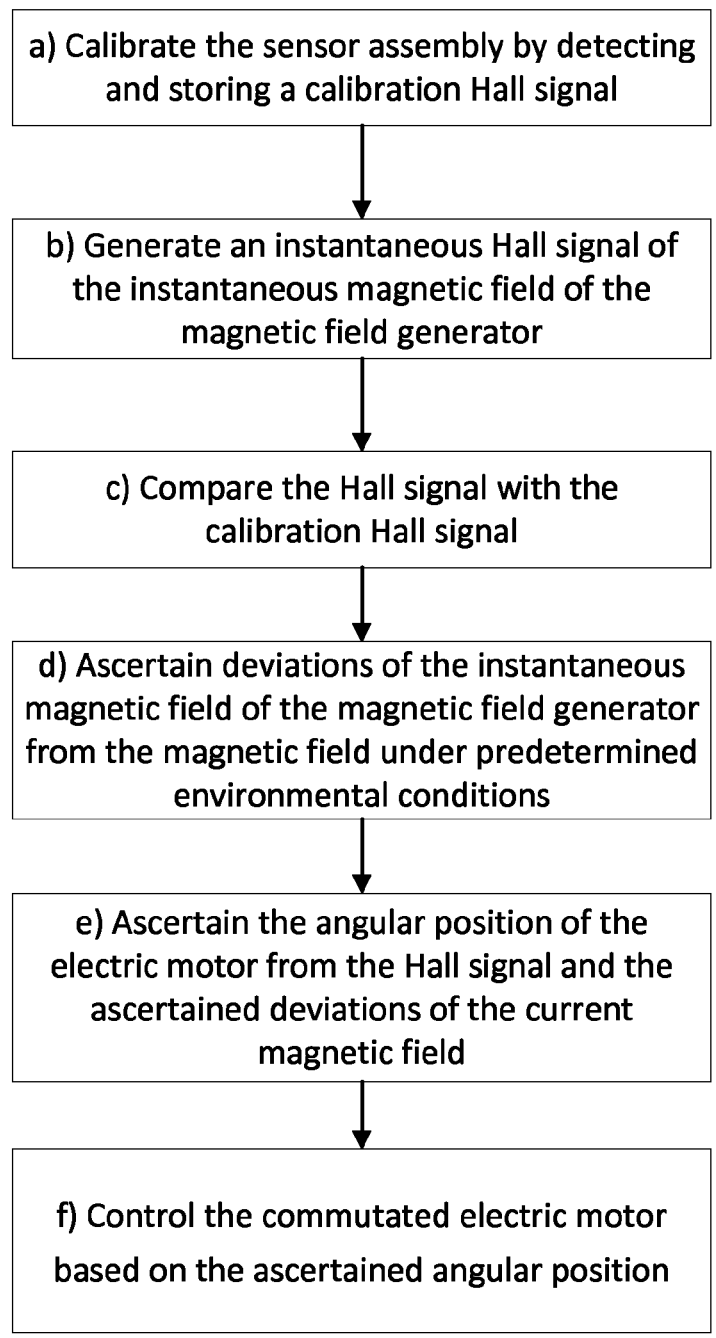

COMMUTATED ELECTRIC DRIVE AND METHOD FOR CONTROLLING A COMMUTATED ELECTRIC MOTOR

FIELD OF THE INVENTION

The present invention is directed to a commutated electric drive and a method for controlling a commutated electric motor.

BACKGROUND INFORMATION

High-current electrically commutated drives are used in today's motor vehicles in a variety of applications, for example in the electrical servo steering or in the belt-driven starter. In order to control the commutation, the relative position of the stator field and the rotor field must be known. Today's systems use a combination of AMR and digital Hall sensors for ascertaining the angular position.

Thus, DE 102006060808 A1 discusses an angle sensor for detecting the rotation angle of a component which is rotatable about an axis of rotation, having a transducer magnet, which is coaxially connectable to the rotatable component, having a digital Hall element and a magnetoresistive sensor element situated fixedly in the region of the magnetic field. An angle signal of the 360 degree angle range is generatable from the combination of the analog signal of the magnetoresistive sensor element and the digital signal. Such systems may detect the direction, but not the amplitude of the field of the transducer magnet. Temperature-dependencies and aging of the transducer field negatively affect the 360-degree measurement unambiguousness of the angle sensor due to the considerable hysteresis of the digital Hall sensor.

SUMMARY OF THE INVENTION

The commutated electric drive according to the exemplary embodiments and/or exemplary methods of the present invention has multiple advantages over the related art. According to the exemplary embodiments and/or exemplary methods of the present invention, the drive has a magnetic field generator, in particular a permanent magnet, on a shaft of the electric motor and an analog Hall sensor stationary relative to the magnetic field generator. The controller has a memory in which calibration data of the Hall sensor over a full shaft revolution are stored. During the operation of the drive, instantaneous measuring signals of the Hall sensor are compared with the calibration data. Current environmental effects, which differ from the calibration conditions, and aging of the field of the magnetic field generator may thus be recognized and taken into account. An analog Hall sensor has the additional advantage over a digital Hall sensor of a considerably smaller hysteresis, thus making a better angular resolution possible.

The magnetic field generator may be a permanent magnet. However, an embodiment is also possible in which the magnetic field generator is a soft magnetic metal plate, i.e., a metal plate made of a soft magnetic material, and a permanent magnet is situated stationary relative to the stator of the electric motor in such a way that the rotating metal plate as a magnetic field generator generates an interference with the magnetic field of the stationary permanent magnet; in other words, it generates a magnetic interference field.

The exemplary embodiments of the device according to the present invention described herein in general are based on a permanent magnet as magnetic field generator. One system has a multipole permanent magnet situated symmetrically to the shaft center on its front face and a linear Hall sensor next to the shaft center. Another advantageous system has a multipole permanent magnet symmetric to the shaft center and a planar Hall sensor on the shaft center. The planar Hall sensor also delivers an analog signal which is proportional to the field intensity of the magnetic field and allows for an additional design option.

Another advantageous embodiment of the present invention has a multipole permanent magnet situated symmetrically to the shaft center, an AMR sensor on the shaft center, and a linear Hall sensor next to the shaft center. With the aid of the AMR sensor, a 360-degree unambiguousness of the rotor position of the electric motor is achievable. The corresponding design option using the planar Hall sensor has a multipole permanent magnet symmetric to the shaft center, an AMR sensor on the shaft center, and a planar Hall sensor axially or laterally next to the AMR sensor.

Controlling the currents of the individual windings of the electric motor on the basis of the ascertained angular position of the rotor is known to those skilled in the art and will not be described in detail here. Only the options additionally provided by the exemplary embodiments and/or exemplary methods of the present invention are described. The method according to the present invention for controlling a commutated electric motor has the following steps:

a) calibrating the sensor assembly by detecting and storing a calibration Hall signal of the magnetic field of the magnetic field generator, measured using the Hall sensor, under predetermined environmental conditions over one shaft revolution. This may take place during the manufacture of the drive. The calibration Hall signal is used as reference for the signal measured again during later operation. The following method steps are repeated during the operation.

b) generating an instantaneous Hall signal of the instantaneous magnetic field of the magnetic field generator using the Hall sensor. This measurement takes place during operation and thus under the instantaneous environmental conditions.

c) comparing the Hall signal with the calibration Hall signal;

d) ascertaining deviations of the instantaneous magnetic field of the magnetic field generator from the magnetic field under predetermined environmental conditions. Differences among the magnetic fields arise due to the different environmental conditions during calibration and during operation, as well as due to aging of the field of the permanent magnet; this is true for all permanent magnet systems whether situated on the shaft or stationary relative to the stator.

e) ascertaining the angular position of the electric motor from the Hall signal and the ascertained deviations of the instantaneous magnetic field. The ascertained deviations may result in a correction of the angular position from the Hall signal.

f) controlling the commutated electric motor on the basis of the data of the ascertained angular position.

One advantageous embodiment of the present invention provides for ascertaining the demagnetization of the permanent magnet from the ascertained deviations. An indicator signal may be generated in the event of an excessively weak measured magnetic field intensity of the permanent magnet. The electric motor advantageously has an AMR sensor and the signal of the AMR sensor is used for achieving a 360-degree unambiguousness. It is possible to compensate magnetic interference fields at the location of the Hall sensor by taking into account known currents through the windings of the electric motor and the instantaneous field intensity of the permanent magnet during calibration and/or when the instantaneous Hall signal is generated.

Exemplary embodiments of the present invention are elucidated with reference to the drawings.

BRIEF DESCRIPTION OF THE DRAWINGS

FIG. 5 shows a flow chart of the method according to the present invention.

DETAILED DESCRIPTION

Figure 1:
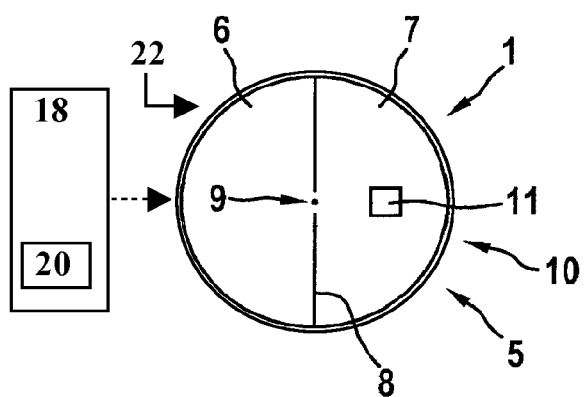
FIG. 1 shows a schematic illustration of a sensor assembly according to the present invention.

A commutated electric drive according to the present invention, having an electric motor including a sensor assembly, has a magnetic field generator, in particular a permanent magnet, on a shaft of the electric motor. Magnetic sensors are situated stationary relative to a stator of the motor opposite to the magnetic field generator rotating together with the shaft. FIGS. 1 through 4 schematically show different specific embodiments of sensor assemblies 1, 2, 3, 4 according to the present invention, each in side view from a front face of the motor shaft, the magnetic field generator being a permanent magnet here, and the shared elements of the specific embodiments being cited first. Permanent magnet 5 having poles 6 and 7, identified by pole separation line 8, is situated on motor shaft 10 symmetrically relative to shaft center 9. For this purpose, the types and positions of the magnetic sensors are shown.

FIG. 1 shows a sensor assembly 1 according to the present invention in a first specific embodiment. Double-pole permanent magnet 5 is symmetric to shaft center 9. Sensor assembly 1 has a linear Hall sensor 11 next to shaft center 9, shifted from shaft center 9 toward the center of the magnetic field of permanent magnet 5, perpendicularly to pole separation line 8.

Figure 2:
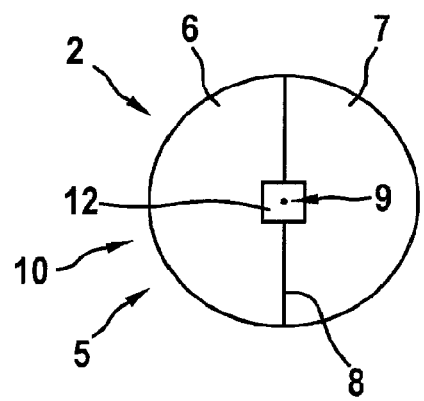
FIG. 2 shows a schematic illustration of a sensor assembly according to the present invention in a second specific embodiment.

In FIG. 2, which shows a sensor assembly 2 according to the present invention in a second specific embodiment, in addition to double-pole permanent magnet 5, which is again symmetric relative to shaft center 9, a planar Hall sensor 12 is situated on shaft center 9.

Figure 3:
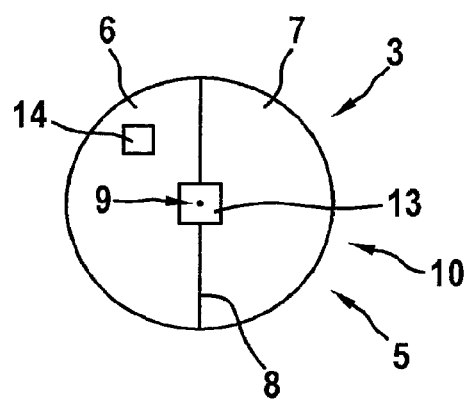
FIG. 3 shows a schematic illustration of a sensor assembly according to the present invention in a third specific embodiment.

FIG. 3 shows a sensor assembly 3 according to the present invention in a third specific embodiment. Double-pole permanent magnet 5 is again symmetric to shaft center 9. An AMR sensor 13 is situated on shaft center 9. A linear Hall sensor 14 is situated next to shaft center 9, shifted from shaft center 9 at a 45-degree angle relative to pole separation line 8.

Figure 4:
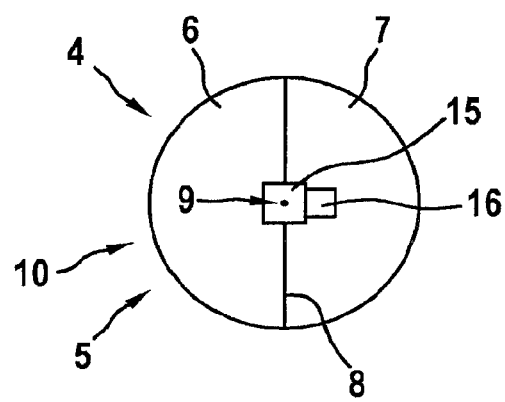
FIG. 4 shows a schematic illustration of a sensor assembly according to the present invention in a fourth specific embodiment.

FIG. 4 shows a sensor assembly 4 according to the present invention in a fourth specific embodiment. Double-pole permanent magnet 5 is again symmetric to shaft center 9. An AMR sensor 15 is situated on the shaft center and a planar Hall sensor 16 is situated next to AMR sensor 15, shifted from shaft center 9 in a direction perpendicular to pole separation line 8.

The drive furthermore has a controller 18 for controlling windings 22 of the electric motor, the controller having a memory 20 for storing a calibration Hall signal of the magnetic field of permanent magnet 5, measured using Hall sensor 11, 12, 14, 16, under predetermined environmental conditions over a shaft revolution, and the controller having a device for comparing an instantaneous Hall signal of the instantaneous magnetic field of the permanent magnet, measured using the Hall sensor, with the calibration Hall signal.

FIG. 5 shows a flow chart of the method according to the present invention for controlling the above-described commutated electric motor. The method starts with step a) calibrating the sensor assembly by detecting and storing a calibration Hall signal of the magnetic field of the magnetic field generator, measured using the Hall sensor, under predetermined environmental conditions over one shaft revolution. This method step takes place during the manufacture of the drive. The following method steps are repeated during the operation. Follows step b) generating an instantaneous Hall signal of the instantaneous magnetic field of the magnetic field generator using the Hall sensor. This measurement takes place during operation and thus under the instantaneous environmental conditions. Now follows step c) comparing the Hall signal with the calibration Hall signal. In step d) deviations of the instantaneous magnetic field of the magnetic field generator from the magnetic field under predetermined environmental conditions are ascertained. Differences among the magnetic fields arise due to the different environmental conditions during calibration and during operation, as well as due to aging of the field of the permanent magnet. In step e) the angular position of the electric motor is ascertained from the Hall signal and the ascertained deviations of the current magnetic field. The ascertained deviations may result in a correction of the angular position from the Hall signal, in particular at extreme temperatures and in the case of old age of the sensor due to demagnetization. In step f) the commutated electric motor is controlled on the basis of the data of the ascertained angular position.

The controller ascertains the demagnetization of the permanent magnet from the ascertained deviations. It is pointed out again that taking into account aging and demagnetization of the permanent magnet according to the present invention applies to all permanent magnet systems both on the shaft and situated stationary relative to the stator in the case of a rotating soft magnetic metal plate. The controller generates an indicator signal in the event of an excessively weak measured magnetic field intensity of the permanent magnet. The controller compensates magnetic interference fields at the location of the Hall sensor by taking into account known currents through the windings of the electric motor and the known field intensity of the permanent magnet field during calibration and when the instantaneous Hall signal is generated.

In an electric motor which also has an AMR sensor 13, 15, the controller uses the signal of the AMR sensor for achieving a 360-degree unambiguousness.

What is claimed is:

1. A commutated electric drive, comprising:
   an electric motor;
   a sensor assembly that includes a magnetic field generator on a shaft of the electric motor and an analog Hall sensor stationary relative to a stator of the electric motor opposite to the magnetic field generator; and
   a controller for controlling windings of the electric motor, the controller including:
   a memory for storing a calibration Hall signal of the magnetic field of the magnetic field generator, measured using the Hall sensor, under predetermined environmental conditions over one shaft revolution; and a device configured to:
  compare an instantaneous Hall signal of the instantaneous magnetic field of the magnetic field generator, measured using the Hall sensor, with the calibration Hall signal;
  ascertain a deviation of the instantaneous magnetic field from the magnetic field under the predetermined environmental conditions;
  ascertain an angular position of the electric motor from the instantaneous Hall signal and the ascertained deviation; and
  control the commutated electric motor on the basis of the ascertained angular position.

2. The commutated electric drive of claim 1, wherein the magnetic field generator includes a permanent magnet.

3. The commutated electric drive of claim 2, wherein a multipole permanent magnet is situated symmetrically to the shaft center and a linear Hall sensor next to the shaft center.

4. The commutated electric drive of claim 2, wherein a multipole permanent magnet is situated symmetrically to the shaft center and a planar Hall sensor on the shaft center.

5. The commutated electric drive of claim 2, wherein a multipole permanent magnet is situated symmetrically to the shaft center, an AMR sensor on the shaft center, and a linear Hall sensor next to the shaft center.

6. The commutated electric drive of claim 2, wherein a multipole permanent magnet is situated symmetrically to the shaft center, an AMR sensor on the shaft center, and a planar Hall sensor next to the AMR sensor.

7. The commutated electric drive of claim 1, wherein the magnetic field generator includes a soft magnetic metal plate and a permanent magnet is situated stationary relative to the stator of the electric motor so that the magnetic field generator generates an interference of the magnetic field of the stationary permanent magnet.

8. A method for controlling a commutated electric motor, which includes a sensor assembly which includes a magnetic field generator on a shaft of the electric motor and an analog Hall sensor stationary relative to a stator of the electric motor opposite to the magnetic field generator, the method comprising:

a) calibrating the sensor assembly by detecting and storing a calibration Hall signal of the magnetic field of the magnetic field generator, measured using the Hall sensor, under predetermined environmental conditions over one shaft revolution;
b) generating an instantaneous Hall signal of the instantaneous magnetic field of the magnetic field generator using the Hall sensor;
c) comparing the instantaneous Hall signal with the calibration Hall signal;
d) ascertaining deviations of the instantaneous magnetic field of the magnetic field generator from the magnetic field under the predetermined environmental conditions;
e) ascertaining the angular position of the electric motor from the instantaneous Hall signal and the ascertained deviations of the instantaneous magnetic field; and
f) controlling the commutated electric motor on the basis of the ascertained angular position.

9. The method of claim 8, wherein the magnetic field generator includes a permanent magnet.

10. The method of claim 8, wherein the magnetic field generator includes a soft magnetic metal plate, and a permanent magnet is situated stationary relative to the stator of the electric motor so that the magnetic field generator generates an interference of the magnetic field of the stationary permanent magnet.

11. The method of claim 9, wherein the demagnetization of the permanent magnet is ascertained from the ascertained deviations.

12. The method of claim 9, wherein an indicator signal is generated in the event of an excessively weak measured magnetic field intensity of the permanent magnet.

13. The method of claim 9, wherein in the electric motor, which has an AMR sensor, the signal of the AMR sensor is used for achieving a 360-degree unambiguousness.

14. The method of claim 9, wherein magnetic interference fields at the location of the Hall sensor are compensated by taking into account known currents through the windings of the electric motor and the known field intensity of the permanent magnet field during at least one of calibration and when the instantaneous Hall signal is generated.

15. A commutated electric drive, comprising:
  an electric motor;
  a sensor assembly that includes:
    a planar analog Hall sensor that is stationary relative to a stator of the electric motor and is situated on a center of a shaft of the electric motor; and
    a multipole permanent magnet that is configured to generate a magnetic field and that is situated symmetrically to the center of the shaft; and
  a controller for controlling windings of the electric motor, the controller including:
    a memory for storing a calibration Hall signal of the magnetic field of the magnetic field generator, measured using the Hall sensor, under predetermined environmental conditions over one shaft revolution; and
    a device configured to compare an instantaneous Hall signal of the instantaneous magnetic field of the magnetic field generator, measured using the Hall sensor, with the calibration Hall signal.

* * * * *